United States Patent [19]
Shou et al.

[11] Patent Number: 6,073,149
[45] Date of Patent: Jun. 6, 2000

[54] COMPUTATIONAL CIRCUIT

[75] Inventors: Guoliang Shou; Kazunori Motohashi; Ying Chen; Takashi Tomatsu; Changming Zhou; Jie Chen, all of Tokyo, Japan

[73] Assignee: Yozan, Inc., Tokyo, Japan

[21] Appl. No.: 09/060,000

[22] Filed: Apr. 15, 1998

[30] Foreign Application Priority Data

Apr. 16, 1997 [JP] Japan .................................... 9-113662
Jun. 11, 1997 [JP] Japan .................................... 9-169444

[51] Int. Cl.[7] ................................ G06J 1/00; G06G 7/00; G06F 7/00
[52] U.S. Cl. ............................... 708/3; 708/801; 708/493
[58] Field of Search .............................. 708/3, 801, 493, 708/670

[56] References Cited

U.S. PATENT DOCUMENTS 5,917,742  6/1999  Ohmi et al. ............................ 708/493

OTHER PUBLICATIONS

Kameyama et al, "Modular Design of Multiple–Value Arithmetic VLSI System Using Signed–Digit Number System" IEEE, pp. 355–362, 1990.

Kawahito et al, "Multiple–Value Current–Mode Arithmetic Circuits Based on Redundant Positive–Digit Number Representation, " IEEE, pp. 330–339, 1991.

Micheel et al, "Differential Multiple–Value Logic Using Resonant Tunneling Diodes", Electronic Technology Lab. (Wright–Patterson AFB, OH), pp. 1–7, Undated.

Micheel et al, "Multiple–Value Logic Computation Circuit Using Micro–and Nanoelectronic Device", IEEE Comp. Society Press Reprint, May 24–27, 1993 Sacramento, CA, pp. 164–169.

Micheel, "Heterojunction Bipolar Technology for Emitter–Coupled Multiple–Valued Logic in Gigahertz Adders and Multipliers" Proceeding from IEEE Comp. Society Technical Committee, May 27–29, 1992, Sendai, Japan, pp. 18–26.

*Primary Examiner*—Tan V. Mai
*Attorney, Agent, or Firm*—Pillsbury Madison & Sutro LLP

[57] ABSTRACT

A computational circuit for a multi-value addition comprising a parallel adder, an output adder, a quantizing portion and a logic conversion portion. Addition circuits in the above adders and thresholding circuits in the above quantizing portion consist of voltage-driven circuits including capacitive couplings.

6 Claims, 13 Drawing Sheets

| Linear Addition $Z_i$ | Quantizing Output | | | | Logic Conversion Output | |
|---|---|---|---|---|---|---|
| | $b_0$ | $b_1$ | $b_2$ | $b_3$ | $C_i$ | $W_i$ |
| −6 | 0 | 0 | 0 | 0 | −1 | −2 |
| −5 | 1 | 0 | 0 | 0 | −1 | −1 |
| −4 | 0 | 1 | 0 | 0 | −1 | 0 |
| −3 | 1 | 1 | 0 | 0 | −1 | 1 |
| −2 | 0 | 0 | 1 | 0 | −1 | 2 |
| −1 | 1 | 0 | 1 | 0 | 0 | −1 |
| 0 | 0 | 1 | 1 | 0 | 0 | 0 |
| 1 | 1 | 1 | 1 | 0 | 0 | 1 |
| 2 | 0 | 0 | 0 | 1 | 1 | −2 |
| 3 | 1 | 0 | 0 | 1 | 1 | −1 |
| 4 | 0 | 1 | 0 | 1 | 1 | 0 |
| 5 | 1 | 1 | 0 | 1 | 1 | 1 |
| 6 | 0 | 0 | 1 | 1 | 1 | 2 |

| $b_0$ $b_1$ $b_2$ $b_3$ | $W_2$ $W_1$ $W_0$ | $W_i$ | $C_1$ $C_0$ | $C_i$ |
|---|---|---|---|---|
| 0 0 0 0 | 0 0 0 | −2 | 0 0 | −1 |
| 1 0 0 0 | 0 0 1 | −1 | 0 0 | −1 |
| 0 1 0 0 | 0 1 0 | 0 | 0 0 | −1 |
| 1 1 0 0 | 0 1 1 | 1 | 0 0 | −1 |
| 0 0 1 0 | 1 0 0 | 2 | 0 0 | −1 |
| 1 0 1 0 | 0 0 1 | −1 | 0 1 | 0 |
| 0 1 1 0 | 0 1 0 | 0 | 0 1 | 0 |
| 1 1 1 0 | 0 1 1 | 1 | 0 1 | 0 |
| 0 0 0 1 | 0 0 0 | −2 | 1 0 | 1 |
| 1 0 0 1 | 0 0 1 | −1 | 1 0 | 1 |
| 0 1 0 1 | 0 1 0 | 0 | 1 0 | 1 |
| 1 1 0 1 | 0 1 1 | 1 | 1 0 | 1 |
| 0 0 1 1 | 1 0 0 | 2 | 1 0 | 1 |

FIG. 14

| Node | Multi-Value | Voltage |
|---|---|---|
| $x_0, \cdots, x_i, \cdots$<br>$y_0, \cdots, y_i, \cdots$<br>$s_0, \cdots, s_i, \cdots$ | 3<br>2<br>1<br>0<br>−1<br>−2<br>−3 | $7/8 Vdd \pm dV1$<br>$6/8 Vdd \pm dV1$<br>$5/8 Vdd \pm dV1$<br>$4/8 Vdd \pm dV1$<br>$3/8 Vdd \pm dV1$<br>$2/8 Vdd \pm dV1$<br>$1/8 Vdd \pm dV1$ |

$dV1 = 1/16 Vdd$

FIG. 15

| Node | Multi-Value | Voltage |
|---|---|---|
| $z_0, \cdots, z_i, \cdots$ | 6<br>5<br>4<br>3<br>2<br>1<br>0<br>−1<br>−2<br>−3<br>−4<br>−5<br>−6 | $25/32 Vdd - dV2$ 以上<br>$23/32 Vdd \pm dV2$<br>$21/32 Vdd \pm dV2$<br>$19/32 Vdd \pm dV2$<br>$17/32 Vdd \pm dV2$<br>$15/32 Vdd \pm dV2$<br>$13/32 Vdd \pm dV2$<br>$11/32 Vdd \pm dV2$<br>$9/32 Vdd \pm dV2$<br>$7/32 Vdd \pm dV2$<br>$5/32 Vdd \pm dV2$<br>$3/32 Vdd \pm dV2$<br>$1/32 Vdd + dV2$ 以下 |

$dV2 = 1/32 Vdd$

FIG. 16

| Node | Multi-Value | Voltage |
|---|---|---|
| $c_0, \cdots, c_i, \cdots$ | 1<br>0<br>−1 | $5/8 Vdd \pm dV1$<br>$4/8 Vdd \pm dV1$<br>$3/8 Vdd \pm dV1$ |
| $w_0, \cdots, w_i, \cdots$ | 2<br>1<br>0<br>−1<br>−2 | $6/8 Vdd \pm dV1$<br>$5/8 Vdd \pm dV1$<br>$4/8 Vdd \pm dV1$<br>$3/8 Vdd \pm dV1$<br>$2/8 Vdd \pm dV1$ |

$dV1 = 1/16 Vdd$

COMPUTATIONAL CIRCUIT

FIELD OF THE INVENTION

The present invention relates to a computational circuit.

BACKGROUND OF THE INVENTION

However, the development of the digital technologies mainly depends on the advanced fine process technologies, the plant and equipment investment is steeply and exponentially increasing. Recently, an analog and analog-digital technologies attract attention of rather low cost for the manufacturing.

A digital system according to a multi-value logic is researched for low-power consumption.

FIG. 22 shows a conventional multi-value adder of quaternary SD number. Only three digits parts are shown for easy understanding.

When two SD-numbers $X=(x_{n-1}, x_{n-2} \ldots, x_0)$ and $Y=(Y_{n-1}, Y_{n-2} \ldots, y_0)$ of a radix R are added, the following three steps are performed.

Step 1)

Corresponding digits, that is, each pair of $x_{n-1}$ and $Y_{n-1}$, $x_{n-2}$ and $y_{n-2}$, ..., x0 and y0 are added with each other. Here, the addition result of xi and yi is zi as in the formula (1).

$$z_i = x_i + y_i \quad (1)$$

Here,
$z_i \in \{-2(K+1) \ldots, 0 \ldots, 2(K+1)\}$,
$x_i \in \{-(K+1), -K, \ldots, -1, 0, 1, \ldots, (K+1)\}$,
$y_i \in \{-(K+1), -K, \ldots, -1, 0, 1, \ldots, (K+1)\}$,
R=2K when R is even number, and
R=2K+1 when R is odd number.

Step 2)

An intermediate sum $w_i$ and a carry $c_i$ are calculated. A relationship between $z_i$ and $w_i$ is shown below.

$$Rc_i + w_i = z_i \quad (2)$$

From formula (2), $c_i$ is calculated by dividing the summation zi by R. The carry $c_i \in \{-1, 0, 1\}$, and its remainder corresponds to intermediate sum wi. Here, the remainder may be negative value to obtain the minimum absolute value of $c_i$.

Step 3)

The summation $s_i$ of the intermediate sum wi and the carry $c_{i-1}$ from the neighboring lower digit is calculated, as shown below.

$$s_i = w_i + c_{i-1} \quad (3)$$

$s_i$ in formula (3) is the final output on ith digit. The SD number is advantageous in that the carry does not influences only the neighboring higher digit. The propagation of the carry does not occur.

The first to third steps above are sequentially performed in the structure in FIG. 22. The first step is performed in adders 101, 102, 103 which output respective linear addition sum $z_{i-1}, z_i, z_{i+1}$. They are input to SD number full adders 111, 112 and 113. The second step is performed in them to output respective intermediate sums $w_{i-1}, w_i$ and $w_{i+1}$, and respective carries $c_{i-1}, c_i$ and $c_{i+1}$. Linear adders 121, 122 and 123 perform the third step to obtain the respective final outputs $s_{i-1}, s_i$, and $s_{i+1}$ on the respective digits (i−1), i and (i+1).

Since the adders 101 to 103, 111 to 113 and 121 to 123 are usually circuits of current driven type, the circuit in FIG. 22 is simplified as shown in FIG. 23. The adders 101 to 103 and 121 to 123 are substituted by simple conjunctures 141 to 143 and 161 to 163.

In spite of the advantages of simplicity of the conventional circuit, the circuit has a problem of a lot of power consumption because a current is constantly supplied for driving the total circuit.

SUMMARY OF THE INVENTION

The present invention has an object to provide a computational circuit of low power-consumption.

A computational circuit according to the present invention performs addition calculations by capacitive couplings.

BRIEF DESCRIPTION OF THE DRAWINGS

FIG. 14 is a table showing a relationship between multi-values and voltages.

FIG. 15 is a table showing another relationship between multi-values and voltages.

FIG. 16 is a table showing another relationship between multi-values and voltages.

EMBODIMENT

Figure 1:
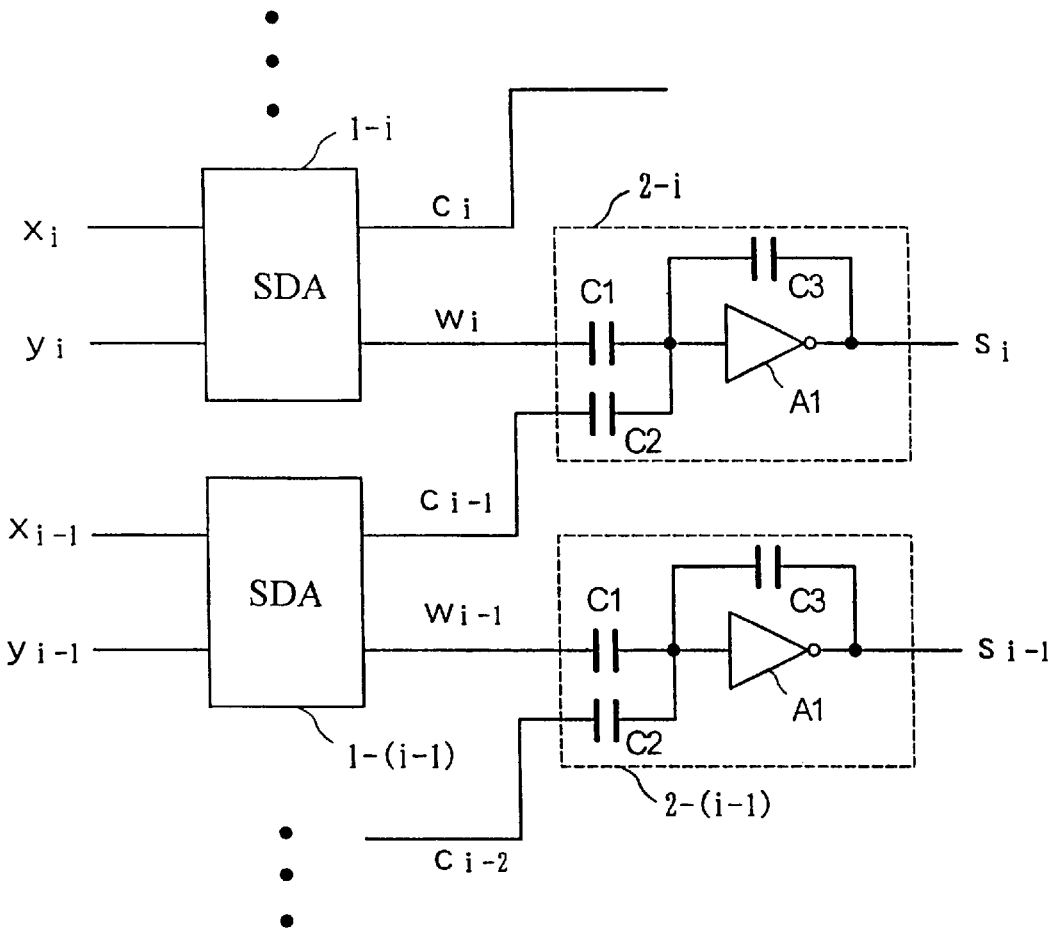
FIG. 1 is a circuit diagram of an embodiment of a multi-value adder according to the present invention.

FIG. 1 shows an embodiment of a multi-value SD number adder according to the present invention, in which circuits for only two digits of (i−1)th and ith digits are shown for easy understanding.

In FIG. 1, two multi-value SD numbers $X=(x_{n-1}, x_{n-2} \ldots, x_i \ldots, x_0)$ and $Y=(y_{n-1}, y_{n-2} \ldots, y_i \ldots, y_0)$ are to be added, and ith and (i−1)th digits of X and Y are input to parallel adders SDA1-i and SDA1-(i−1). The parallel adders SDA1-i performs a liner addition zi=xi+yi, and then an intermediate summation wi and a carry ci are calculated. When the radix of SD number is R, Rci+wi=zi. While, SDAi-(I−1) outputs wi−1 and ci−1, which are Rci−1+wi−1=zi−1.

The intermediate addition sum $wi_{i-1}$ output from the parallel adder SDA1-(i−1) is supplied to an output adder 2-(i−1) so as to be added to a carry $c_{i-1}$ output form parallel adder SDA1-(i−1). The output adder 2-(I−1) adds wi−1 and Ci−2 so as to generate the final output $si_{i-1}$. Therefore, Si−1=wi−1+Ci−2. Similarly, the intermediate summation wi and carry ci−1 are input to an output adder 2-i so that a final output si=wi+ci−1 is generated. ci−1∈{−1, 0, 1} and ci∈{−1, 0, 1}, and ci and ci−1 are determined so that an absolute values of reminders are minimized of a division of zi and zi−1 by R.

The output adder 2-i is a circuit of voltage driven type having a capacitive coupling consisting of capacitances c1 and c2 output of which are connected to a common output terminal. An inverter A1 is connected to an output of said capacitive coupling, and a feedback capacitance c3 is connected to the inverter at its input and output terminals. The capacitances C1, C2 and C3 have capacities of 1:1:1. The inverter A1 consists of odd number of serial CMOS inverters. According to the principle of electrical charge conservation, the output si is given by the formula (4), assuming a offset voltage of A1 is Vb.

$$si=(w_i+c_{i-1})-Vb \qquad (4)$$

The output adder 2-(i−1) is similar to 2-I, and the description thereof is omitted.

Figure 2:
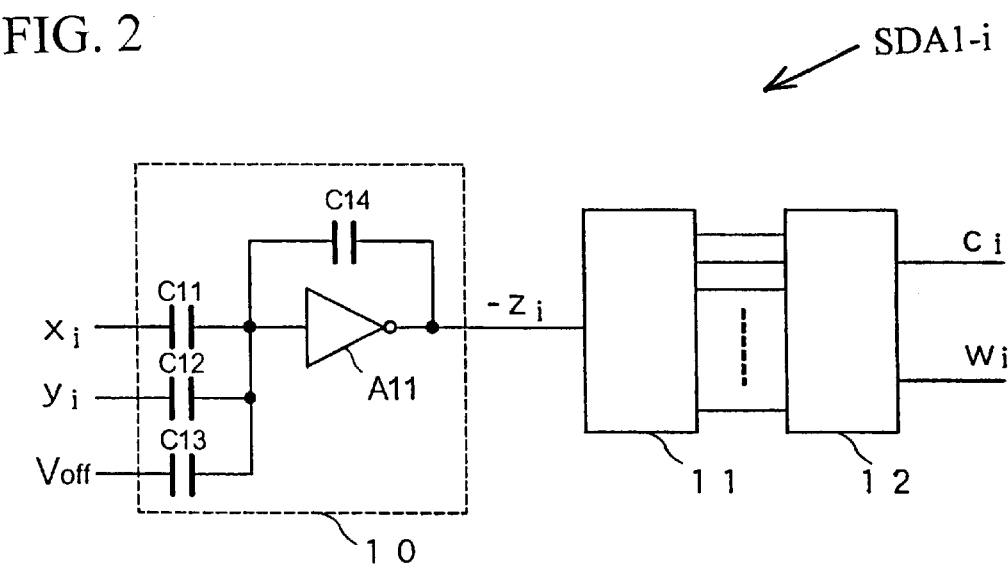
FIG. 2 is a circuit diagram of parallel adder in FIG. 1
Figure 3:
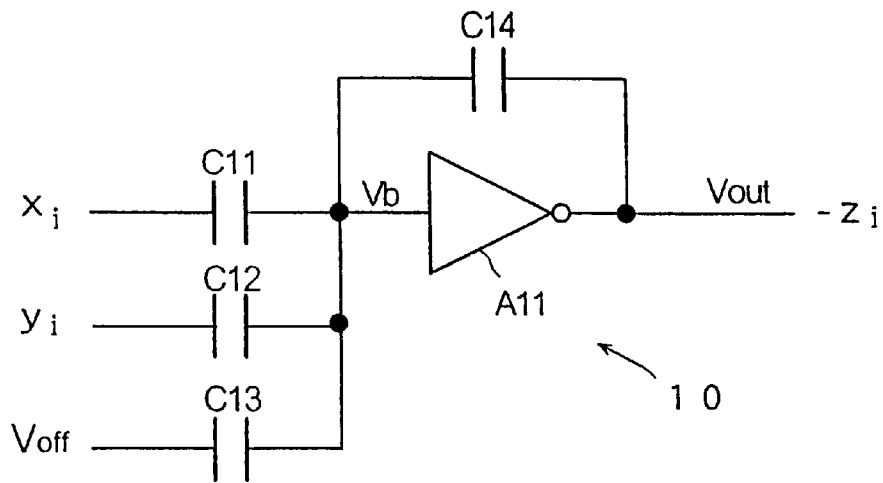
FIG. 3 is a circuit diagram of an adder in the parallel adder in FIG. 2.

As shown in FIGS. 2 and 3, the parallel adder SDA1-i has an addition portion 10, quantizing portion 11 and a logic conversion portion serially connected. The addition portion 10 has a capacitive coupling (c11, c12 and C13) outputs of which are connected to a common output terminal. The inputs xi and yi are input to the capacitances c11 and c12, respectively, and an offset voltage for adjusting an output of the addition portion is input to c13. The capacitive coupling is connected to an inverter A11 to which a feedback capacitance C14 is connected at its input and output terminals. The capacitances C11, C12, C13 and C14 have capacities of 1:1:2:2, so an output of the addition portion 10 is as in the formula (5), wherein the output of the addition portion 10 is −zi.

$$zi-Vb=-(xi+yi+2\cdot Voff) \qquad (5)$$

Figure 4:
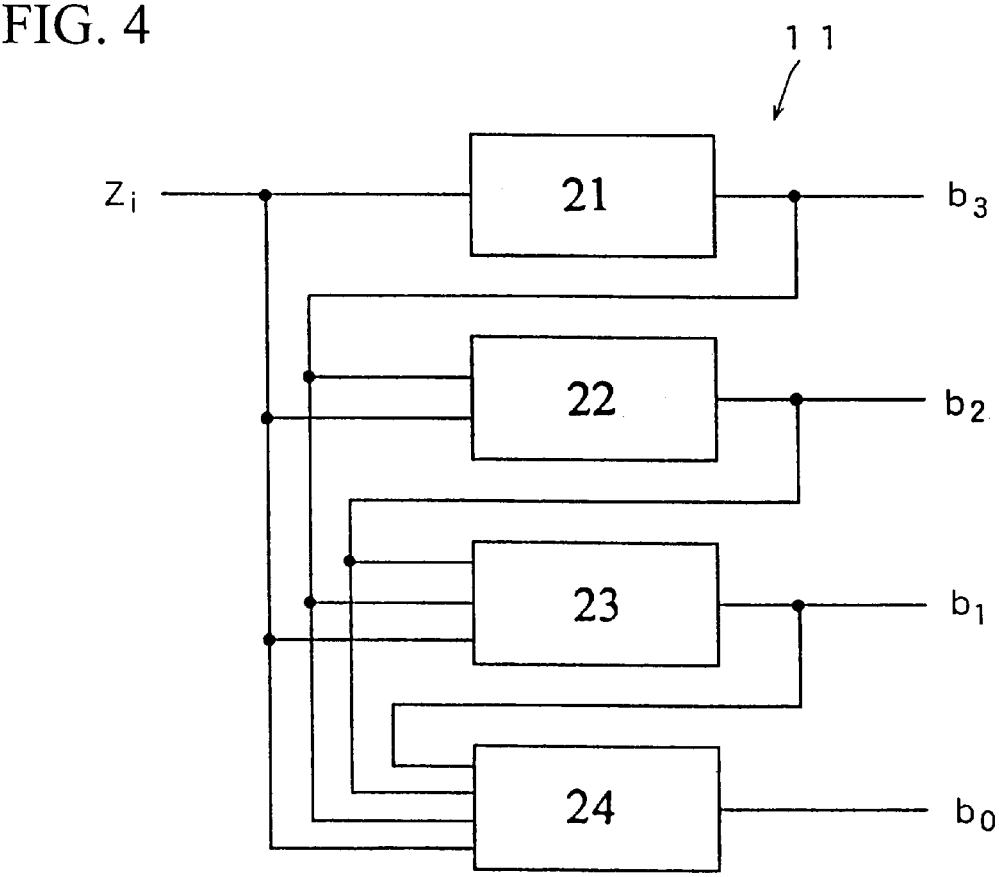
FIG. 4 is a block diagram of the quantizing portion in FIG. 2.
Figure 5:
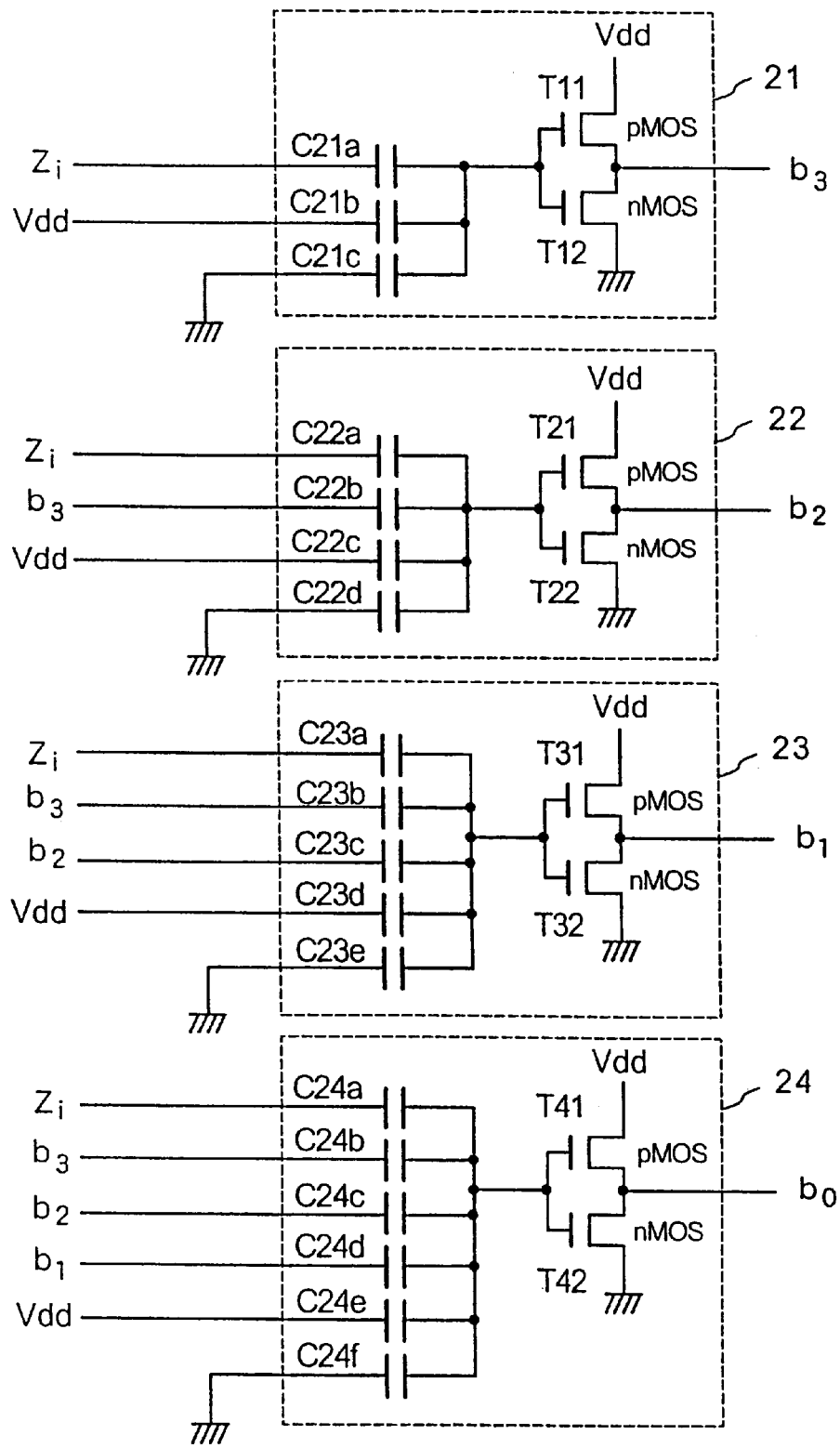
FIG. 5 is a circuit diagram of the quantizing portion in FIG. 4.

The output −zi is input to the quantizing circuit 11 for quantizing −zi into a binary number. As shown in FIGS. 4 and 5, Quantizing portion 11 is also a voltage-driven circuit. FIG. 4 shows a block diagram of the portion 11, in which multi-value inputs X and Y are quaternary.

When X and Y are quaternary, operation 4ci+wi=zi is executed to output wi and $c_i$ from logic converter 12. Digit value $a_i$ on each digit where X and Y are quaternary makes the value as below:

$$a_i \in \{-(K+1), -K \ldots, -1, 0, 1 \ldots, K, (K+1)\}$$

Therefore, multi-value inputs $x_i$ and $y_i$ are as below:

$$x_i \in \{-3, -2, -1, 0, 1, 2, 3\}$$

$$y_i \in \{3, -2, -1, 0, 1, 2, 3\}$$

Therefore, linear addition sum $-z_i$ is:

$$z_i \in \{-6, -5, -4, -3, -2, -1, 0, 1, 2, 3, 4, 5, 6\}$$

Figures 6, 7:
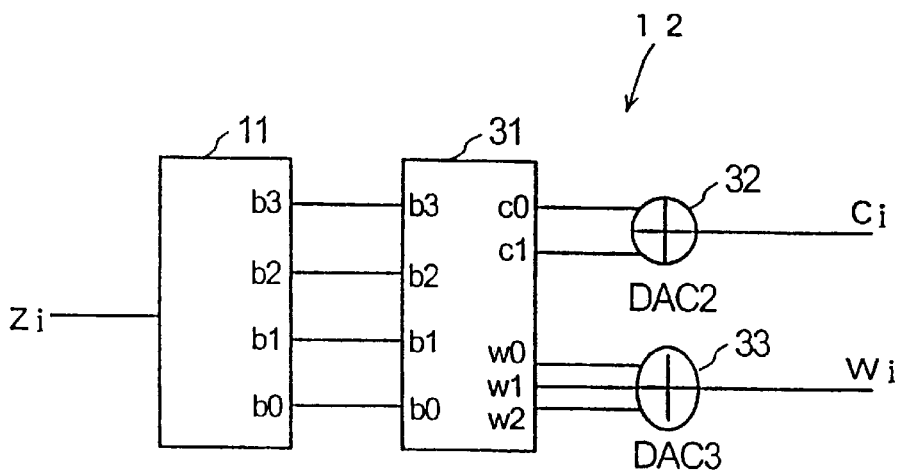
FIG. 6 is a table showing a relationship among linear addition sum, an output of the quantizer, and an output of logic converter in the above embodiment.
FIG. 7 is a block diagram of a logic conversion portion in FIG. 2.

Here, intermediate sum wi and carry ci are defined as below according to $z_i$:
when $2 \leq z_i$,
  $w_i=z_i-4$,
  $c_i=1$
when $-1 \leq z_i \leq 1$,
  $w_i=z_i$,
  $c_i=0$
when $z_i-2$,
  $w_i=z_i+4$,
  $c_i=-1$ FIG. 6 shows the relationship therebetween.

The quantizing portion 11 quantizes addition sum $z_i$ for outputting 4-bit data b3, 2, b1 and b0. Four thresholding circuits 21, 22, 23 and 24 shown in FIG. 4 have thresholds and connections between them so that a four-bit binary data is generated. The first thresholding circuit 21 outputs the most significant bit (MSB) b3, the second circuit 22 outputs the second bit b2, the third circuit 23 output the third bit b1, and the fourth circuit 24 outputs the lowest significant bit (LSB) b0.

FIG. 5 is a circuit diagram of the quantizing portion 11.

The first thresholding circuit 21 having a capacitive coupling including a capacitance C21a connected to the linear addition sum $z_i$, a capacitance C21b connected to a supply voltage Vdd, and a capacitance C21c connected to the ground, outputs of which are connected to a common output terminal. A CMOS inverter consisting of pMOS T11 and nMOS T12 is connected to an output of the capacitive coupling. In this case, the inverter is designed so that its threshold is a half of the supply voltage Vdd of T11 and T12. That is, MSB b3 is 1 until the input charge of the inverter exceeds Vdd/2, and it is 0 when the input charge exceeds Vdd/2.

The second thresholding circuit 22 having a capacitive coupling including a capacitance C22a connected to the linear addition sum $z_i$, a capacitance C22b connected to the MSB b3, a capacitance C22c connected to the supply voltage Vdd, and a capacitance C22d connected to the ground, outputs of which are connected to a common output terminal. A CMOS inverter consisting of pMOS T21 and nMOS T22 is connected to an output of the capacitive coupling. The inverter is designed to be a threshold of a half of the supply voltage Vdd. That is, the second bit b2 is 1 until the input charge of the inverter exceeds Vdd/2, and it is 0 when the input charge exceeds Vdd/2.

The third thresholding circuit 23 having a capacitive coupling including a capacitance C23a connected to the linear addition sum $z_i$, a capacitance C23b connected to b3, a capacitance C23c connected to b2, a capacitance C23d connected to the supply voltage Vdd, a capacitance C21c connected to the ground, outputs of which are connected to a common output terminal. A CMOS inverter consisting of pMOS T31 and nMOS T32 is connected to an output of the capacitive coupling. The inverter is designed to be a threshold of a half of the supply voltage Vdd. That is, the third bit b1 is 1 until the input charge of the inverter exceeds Vdd/2, and it is 0 when the input charge exceeds Vdd/2.

The fourth thresholding circuit 24 having a capacitive coupling including a capacitance C24a connected to the linear addition sum $z_i$, a capacitance C24b connected to the bit b3, a capacitance C24c connected to the bit b2, a capacitance C24d connected to the bit b1, a capacitance C24e connected to the bit b1, a capacitance C24f connected to the supply voltage Vdd, a capacitance C24g connected to the ground, outputs of which are connected to a common output terminal. A CMOS inverter consisting of pMOS T41 and nMOS T42 is connected to an output of the capacitive coupling. The inverter is designed to be a threshold of a half of the supply voltage Vdd. That is, the third bit b1 is 1 until the input charge of the inverter exceeds Vdd/2, and it is 0 when the input charge exceeds Vdd/2.

The CMOS inverter may be a inverter circuit consisting of odd number of CMOS inverters serially connected.

When addition sum zi having multi-value of −6 to 6 is input to thresholding circuit 11, 4-bit data from b3 to b0 like the quantizing portion outputs in FIG. 6 are output. When the level of $z_i$ is −6, 4-bit data 0000 is output, when it is 0, 4-bit data 0110 is output, and when it is 6, 4-bit data 1100 is output.

Since the multi-value of addition sum zi has 13 levels from −6 to 6, the each level is expressed by 13 kinds data from 0000 to 1100: the multi-value 0 corresponds to 4-bit data 0110.

Multi-value level 0 may be another 4-bit data from 0111 to 1001, not limited to 0110. When the 4-bit data corresponding to multi-value level 0 is changed, the offset charge and the configuration in logic processing means 31 needs to be changed according to the data.

As is clear from FIG. 5, the supply voltage in the quantizing circuit 11 is only one for simplifying the configuration of supply voltage, therefore, the input charge is not zero, but the offset predetermined charge, when multi-value level is 0. FIG. 14 shows the charge example expressing each value of multi-value under quaternary multi-values $x_i$ and $y_i$, linear addition sum $s_i$ of the final multi-value addition output are adopted. In FIG. 14, when supply voltage is Vdd, the center value of the charge expressing multi-value level 3 is ⅞ Vdd, and it is ±dV1 (=Vdd/16). After that, the center value expressing the charge decreases by Vdd/8 every time the value decreases. The charge is ±dV1 (=Vdd/16) in any multiple-value.

FIG. 15 shows an example of the charge expressing −6 to 6 in addition sum zi of $x_i$ and $y_i$. It can also be said that FIG. 15 shows the quantizing level of 11 because $z_i$ is input of 11. In FIG. 15, the middle value of the charge expressing multi-value 6 is 25/32 Vdd when supply voltage is Vdd, and it is equal to or more than 25/32 Vdd−dV2 (=24/32Vdd). After that, the middle value expressing the charge decreases by Vdd/16 every time the value decreases. It is ±dV2 (=Vdd/32) excepting −6. It is less than 1/32 Vdd+dV2 (=2/32Vdd) on −6.

The middle value on 0 is 4/8 Vdd in FIG. 14, and that in quantizing portion 11 is 13/32 Vdd in FIG. 15, which is 3/32 Vdd lower. When addition sum zi is input to 11 in such condition, an error occurs because the reference charge is not the same. To prevent the error, the offset voltage Voff is input to inverting amplifier A11 in the adder 10. Voff is set as Vdd·(½+3/32)=19/32Vdd, since the input terminal voltage of A11 is biased toward Vdd/2.

The output charge level of addition sum zi can be adjusted to the quantizing level of quantizing portion 11 by inputting Voff to A11.

FIG. 7 shows the circuit of the logic conversion portion 12 for receiving outputs of the quantizing portion 11 when $x_i$ and $y_i$ are quaternary.

The portion 11 outputs four bits from b3 to b0 corresponding to the level of addition sum zi by quantizing $z_i$. The data b3 to b0 are input to logic converter 12 which includes a logic processing means 31 and two adders 32 and 33. From the means 31, intermediate sum data w0, w1, w2 having two bits and carry data c0 and c1 are output. Intermediate sum data w0, w1 and w2 having three bits are input to the second DA converter 33 (DAC3) to output intermediate sum wi. Carry data c0 and c1 having two bits are input to the first DS converter 32 (DAC2), and carry $c_i$ is output.

Figures 8, 9:
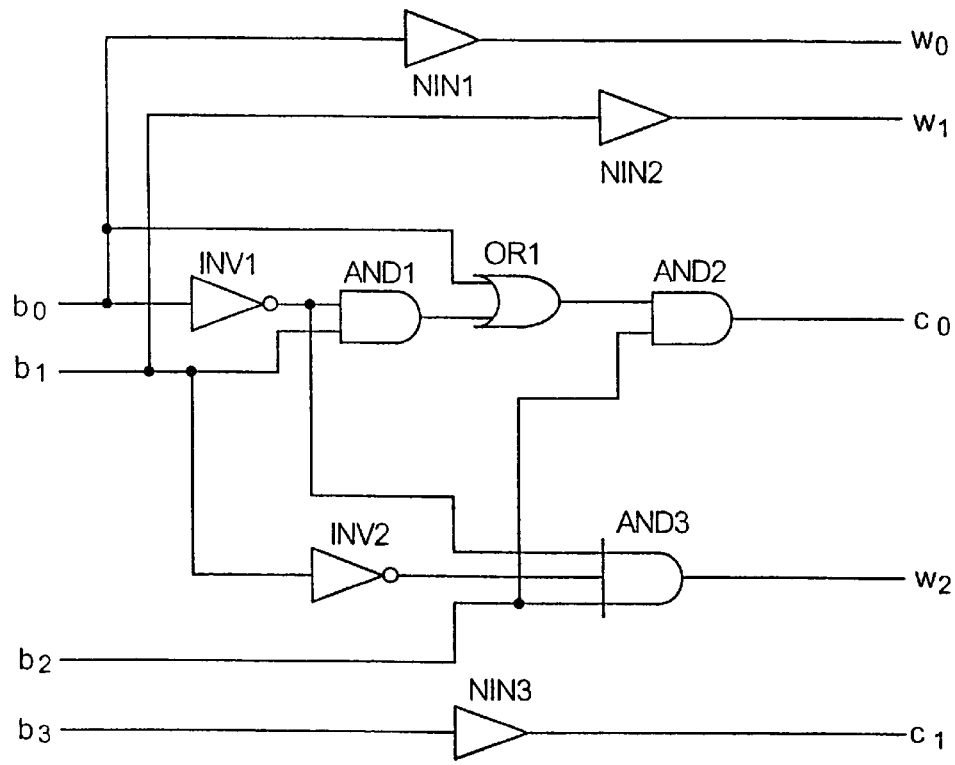
FIG. 8 is a circuit diagram showing the a logic conversion portion in FIG. 2.
FIG. 9 is a table showing a relationship among an output of a quantizer, intermediate sum data, intermediate sum, carry data and a carry of logic conversion portion.

FIG. 8 shows the detail of logic processing means 31 consisting of two inverters INV1 and INV2, three AND gates AND1, AND2 and AND3, three non-inverting logic operators NIN1, NIN2 and NIN3 and an OR operation means OR1, for performing the logic calculation below.

w0=b0, w1=b1, w2=b2*inverted b1 *inverted b0 co=b2*(b0+b1*inverted b0), c1=b3

The logic gates are formed by CMOS digital circuits of voltage-driver type.

FIG. 9 shows the conversion table indicating the relationship among four bits input data b3, b2, b1 and b0, intermediate sum data w0 w1 and w2 which are converted from b3 to b0 according to the logic formulas above to be output, and carry data c0 and c1 in 31 shown in FIG. 8.

Intermediate addition data w0, w1 and w2 output from the means 31 is input to the second DA converter 33, and c0 and c1 are input to the first DA converter 32.

Figure 10:
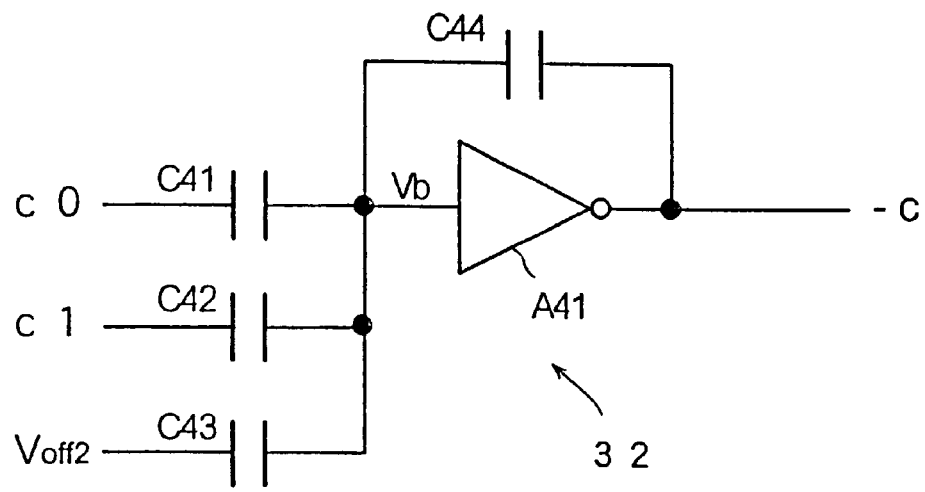
FIG. 10 is a circuit diagram showing the first DA converter in FIG. 7.
Figure 11:
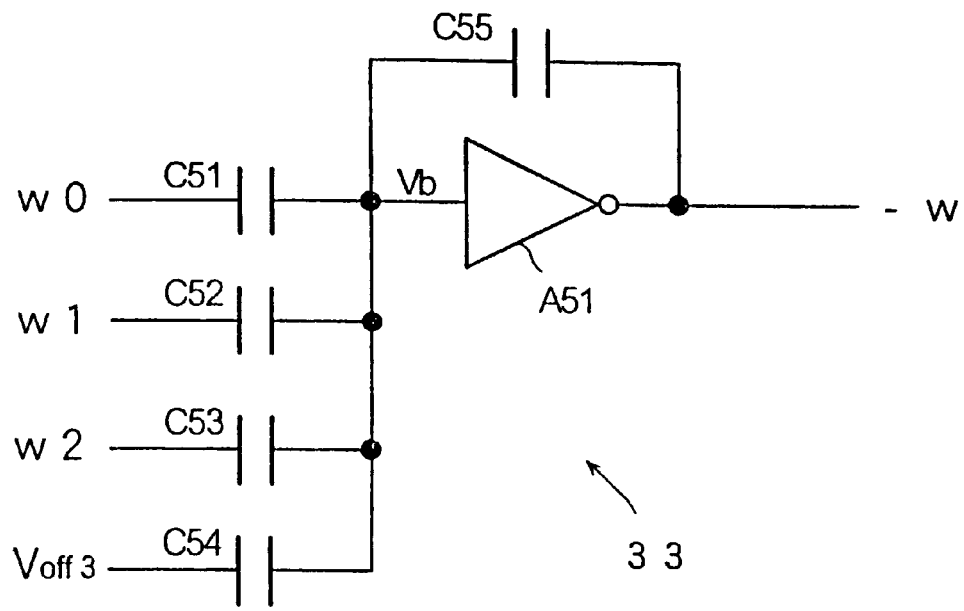
FIG. 11 is a circuit diagram showing the second DA converter in FIG. 7.

The DA converters 32 and 33 are shown in FIGS. 10 and 11, respectively.

The first DA converter 32 shown in FIG. 10 is a voltage-driven circuit including a capacitive coupling consisting of three capacitance's C41, C42 and C43 outputs of which are connected to a common output terminal. An inverting amplifier A41 for outputting the carry (−c) is connected to the captive coupling, and a capacitance C44 is connected between an input and an output of A41. The ratio C41:C42:C43:C44 is 1:2:1:8. C41, C42 and C43 receive carry data c0 and c1, and offset voltage Voff2 for adjusting the output of A41. The voltage VOFF2 and the voltage of input terminal of A41 are set to be Vdd and Vdd/2, respectively, the carry (−c) is shifted by −(Vdd−Vdd/2)*⅛=−Vdd/16. The multi-values "−1", "0" and "1" of carry c corresponds to the multi-value inputs of xi and yi are shown in the upper row of the table in FIG. 16.

The second DA converter 33 shown in FIG. 11 is a voltage-driven circuit including a capacitive coupling consisting of four capacitances C51, C52, C53 and C54 outputs of which are connected to a common output terminal. An inverting amplifier A51 for outputting the intermediate sum (−w) is connected to the capacitive coupling, and a capacitance C55 is connected between an input and an output of A51. The ratio C51:C52:C53:C54:C55 is 1:2:4:3:8. C51, C52, C53 and C54 receive the intermediate sum data w0, w1 and w2, and an offset voltage Voff3 for adjusting the output of A51. The voltage Voff3 and the voltage of input terminal of A51 are set to be Vdd and Vdd/2, respectively, the intermediate sum (−w) is shifted by −(Vdd−Vdd/2)*⅜=−3 Vdd/16. The multi-values "−2", "−1", "0", "1" and "2" of the sum w corresponds to the multi-value inputs of xi and yi are shown in the lower row of the table in FIG. 16.

The configurations of 32 and 33 are not limited to the circuits in FIGS. 10 and 11, they can be changed to those in FIGS. 12 and 13, which are described below.

Figure 12:
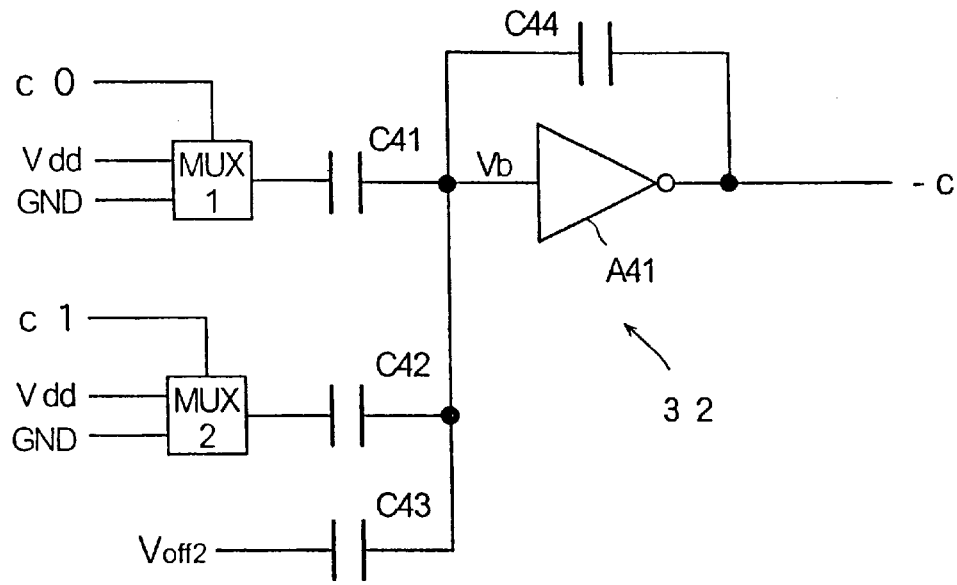
FIG. 12 shows a variation of the first DA converter.

The converter 32 in FIG. 12 selects Vdd or the ground voltage GND to be input to capacitances C41 and C42 according to the carry data c0 and c1. When c0 is 1, Vdd is selected by a multiplexer MUX1 to be output, and when it is 0, GND is selected to be output. The carry c0 is a control signal of MUX1. When c1 is 1, Vdd is selected by a multiplexer MUX2 to be output, and when it is 0, GND is selected by MUX2 to be output. The carry c1 is a control signal of MUX2.

The signal level deterioration of c0 and c1 is prevented by alternatively selecting Vdd or GND by MUX1 and MUX2 to be input to capacitances C41 and C42, respectively. As other configuration in FIG. 12 is similar to those in FIG. 10, their description is omitted.

Figure 13:
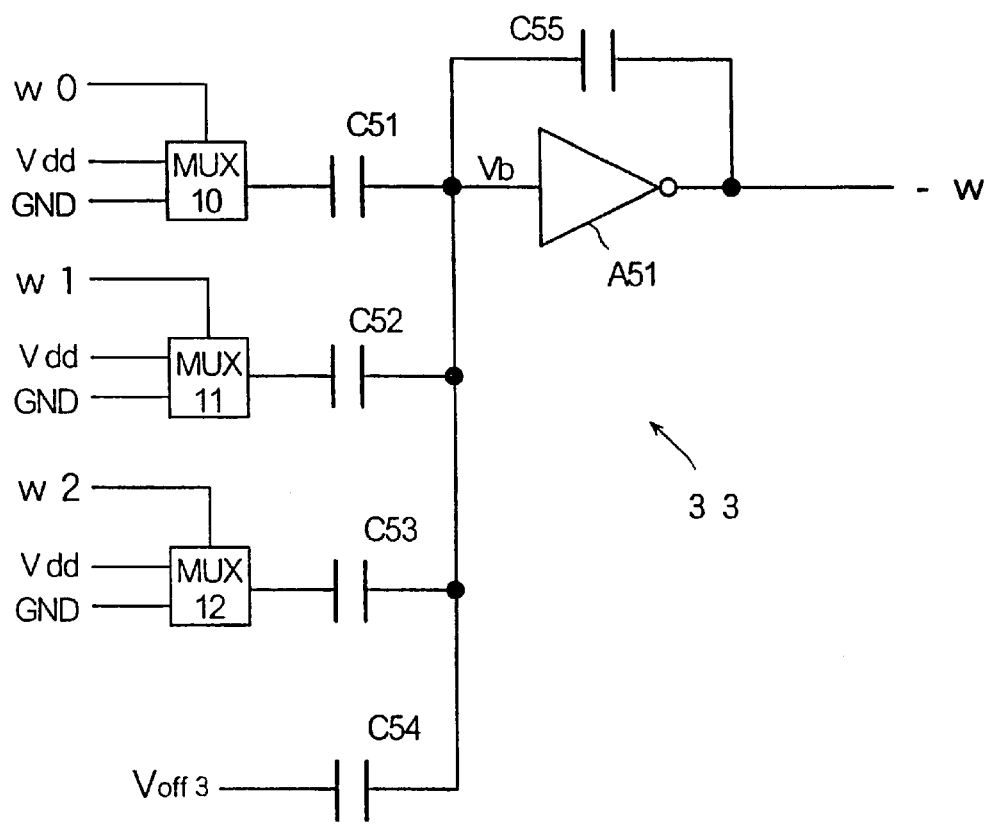
FIG. 13 shows a variation of the second DA converter.

The converter 33 in FIG. 13 selects Vdd or the ground voltage GND to be input to capacitances C51, C52 and C53 according to the intermediate sum data w0, w1 an w2. When w0 is 1, Vdd is selected by a multiplexer MUX10 to be output, and when it is 0, GND is selected to be output. The intermediate sum w0 is a control signal of MUX10. When w1 is 1, Vdd is selected by a multiplexer MUX12 to be output, and when it is 0, GND is selected by MUX12 to be output. The intermediate sum w1 is a control signal of MUX12. When w2 is 1, Vdd is selected by a multiplexer MUX13 to be output, and when it is 0, GND is selected by MUX13 to be output. The intermediate sum w2 is a control signal of MUX13. The signal level deterioration of w0, w1 and w2 is prevented by alternatively selecting Vdd or GND by MUX11, MUX12 and MUX13 to be input to capacitances C51, C52 and C53, respectively. As other configuration in FIG. 13 is similar to those in FIG. 11, their description is omitted.

Figure 17:
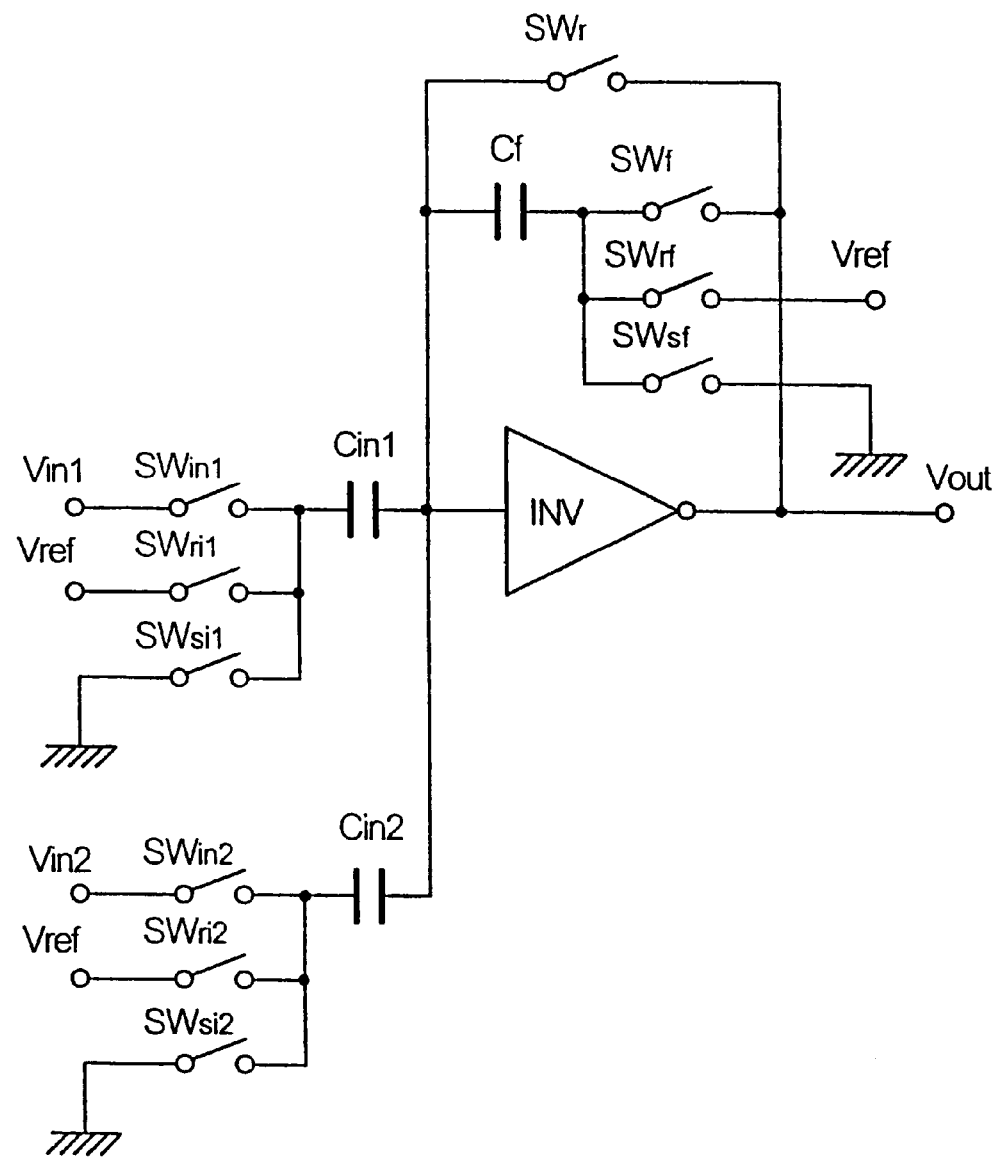
FIG. 17 is a circuit diagram showing an adder having refreshing and sleep function.
Figure 18:
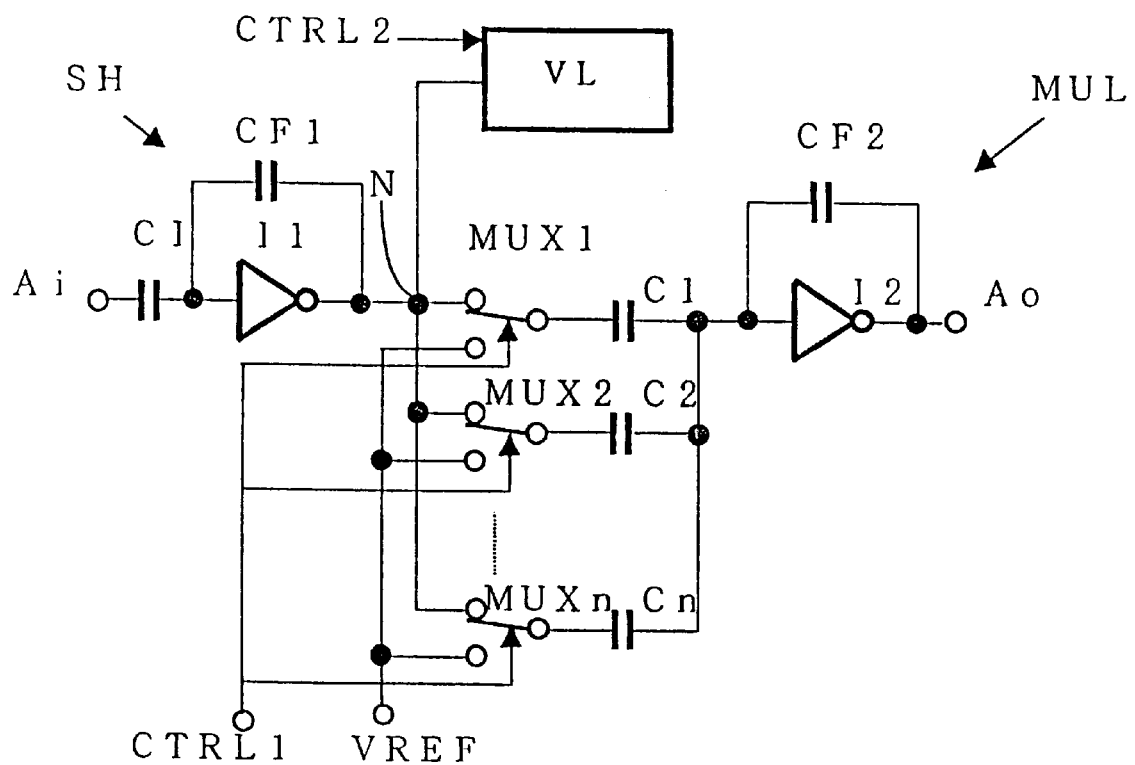
FIG. 18 is a circuit diagram showing a weighted addition circuit.
Figure 19:
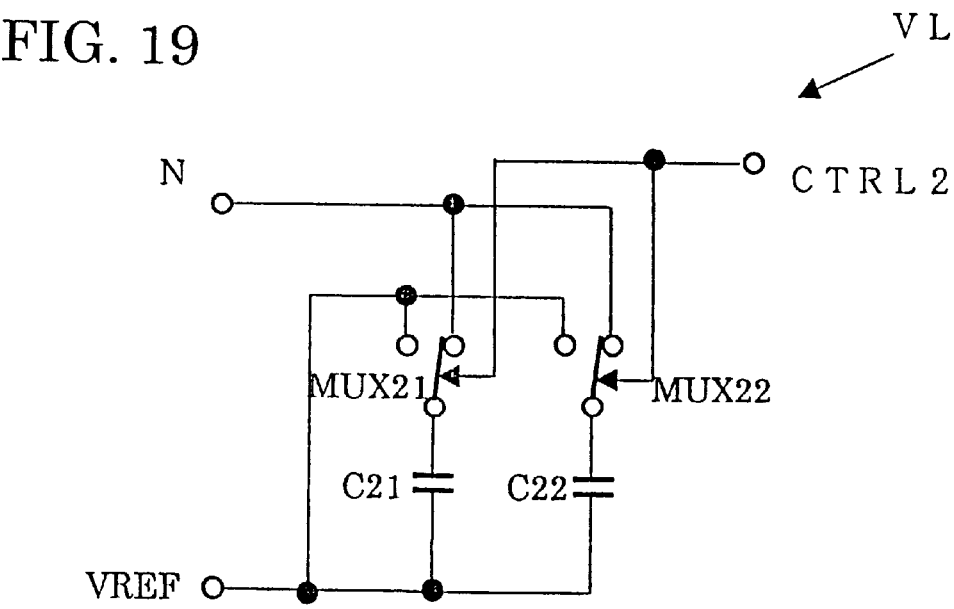
FIG. 19 is a circuit diagram of an additional capacitive load in FIG. 18.

As the multi-value adder of the present invention employs the capacitive couplings, errors may occur in the above mentioned weighted addition due to residual charge in the capacitances. FIG. 17 shows an addition circuit for refreshing and reducing the residual charge. A sleep-mode circuit is also provided for stopping working n order to reduce electrical power consumption. The addition circuit can be applied to adder 10, output adder 2, the first DA converter 32 and the second DA converter 33 in the multi-value. This addition circuit can be changed to be the quantizing portion 11 if the feedback capacitance is removed.

Hereinafter the addition circuit in FIG. 17 is described. This addition circuit includes a capacitive coupling consisting of first and second input capacitances Cin1 and Cin2 outputs of which are commonly connected to an inverter INV. A feedback capacitance Cf is connected to the inverter INV at its input and output terminals. There are provided the first switch SWin1 for inputting the first multi-value input voltage Vin1 to the first input capacitance Cin1, the second switch SWri1 for inputting the reference voltage Vref to the first input capacitance Cin1, the third switch SWr for short-circuiting the feedback capacitance Cf, the fourth switch SWsi1 for grounding the input of Cin1, the fifth switch SWf for connecting the output of inverting amplifier INV to the output of feedback capacitance Cf, the sixth switch SWrf for connecting the output terminal of Cf to Vref, the seventh switch SWsf for connecting the output terminal of Cf to the ground, the eighth switch SWin2 for inputting the second multi-value input voltage Vin2 to the second input capacitance Cin2, the ninth switch SWri2 for inputting Vref to Cin1, and the tenth switch SWsi2 for grounding the input of Cin2.

When the addition calculation is executed, the first, eighth and fifth switches SWin1, SWin2 and SWf are closed and all other switches are opened, then the first and second multi-value input voltage Vin1 and Vin2 are input to the first and second cpacitance Cin1 and Cin2, respectively. The addition output as Vout is output from the output terminal of inverter INV.

When the second, ninth, sixth and third switches SWri1, SWri2, SWrf and SWr are closed and all other ones are opened, Vref is input to the inputs of Cin1 and Cin2 and the output of Cf. The input and output of INV is short-circuited, the residual charge in Cin1, Cin2 and Cf is canceled and refreshed. Then, the output of INV is Vref. Vref is set to be a half of Vdd.

When the fourth, tenth and seventh switches SWsi1, SWsi2 and SWsf are closed and all other ones are opened, the addition circuit becomes the sleep mode. Cf is disconnected from INV so that INV becomes a simple CMOS inverter circuit with its input grounded. It works under the saturated condition, therefore, the power consumption can be stopped in CMOS inverter circuit. The circuit becomes sleep-mode also when Vdd is input to one of the inputs of the capacitances instead of GND.

The first to the tenth switches SWri1 to SWsi2 are controlled by refreshing signals or sleep signals for refreshing and sleep-mode.

Though the quaternary multi-value input is described above, it is not limited to it. The present invention can be applied to multi-value adders of different radix from quaternary.

Although the portions of the multi-value adder of this invention are voltage-driven circuits with one-side supply voltage, they can be the voltage-mode circuits with positive and negative supply voltage instead of them. In this case, the offset is unnecessary because the input the supply voltages can be adjusted.

Though the inverting amplifiers have one stage, they are not limited to it. Odd number of stages of inverters can be applied. The voltages corresponding to multi-value values are not limited to the above description. Any voltages can be given to the value in the multi-value.

Hereinafter, an embodiment of a weighted addition circuit according to the present invention is described. FIG. 6 consists of the same components as those in FIG. 1, and its description is omitted.

FIG. 1 shows a weighted addition circuit MUL, which is structured as a multiplication circuit. It includes a plurality of capacitances C1 to Cn whose output terminals are integrated, switches MUX1 to MUXn connected to the input terminal of each capacitance and for connecting analog input voltage (Vd–Ai) or the reference voltage VREF to the capacitances, inverting amplifying circuit I2 connected to the output of the capacitive coupling, and feedback capacitance CF2 for connecting the output of inverting amplifying circuit to its input, so as to execute the multiplication in formula (1) (weighted addition).

Sampling and holding circuit SH is connected to the input of weighted addition circuit MUL, and additional capacity charge VL is connected to the output of SH (shown with node N) in parallel to the capacitive coupling.

FIG. 2 shows the configuration of additional capacity charge VL. As shown, in VL in FIG. 2, one of the terminals of a plurality of capacitances C21 and C22 are connected to node N through multiplexer MUX21 and MUX22, respectively, and the other terminals of the capacitances are connected to the reference voltage VREF. When multiplexers MUX21 and MUX22 connect one of the terminals to node N or the reference voltage VREF, and VREF is selected, their both terminals are connected to VREF. The input terminal of inverting amplifier I2 is always kept to be the reference voltage, and the voltage equal to the output of the capacitive coupling is input to capacitances C21 and C22.

When the control signal of multiplexers MUX1 to MUXn is CTOL1 that of multiplexers MUX21 and MUX22 is CTRL2, and the weight of capacitive coupling is the 7-bit binary number, CTRL1 is expressed B1 to B7 using the mark above. Here, C21 and C22 have the same capacity of Cn−2=5 and Cn−1=C6, respectively, and the signals connecting MUX21 and MUX22 are the inversions of BV6 and B7, respectively.

Under this condition, node N receives the total load by the capacitive coupling L1 and additional capacity charge L2. Here, formulas (2) and (3) are true.

$$L1 = \sum_{i=2}^{7} 2^{i-1} \cdot Bi \qquad (2)$$

$$L2 = 2^4 \cdot \overline{B6} + 2^5 \cdot \overline{B7} \qquad (3)$$

And the total load Lt of the two is in formula (4).

$$Lt = L1 + L2 = \sum_{i=1}^{5} 2^{i-1} \cdot Bi + (2^4 \cdot \overline{B6} + 2^5 \cdot B6) + (2^5 \cdot \overline{B7} + 2^6 \cdot B7) \qquad (4)$$

Figure 20:
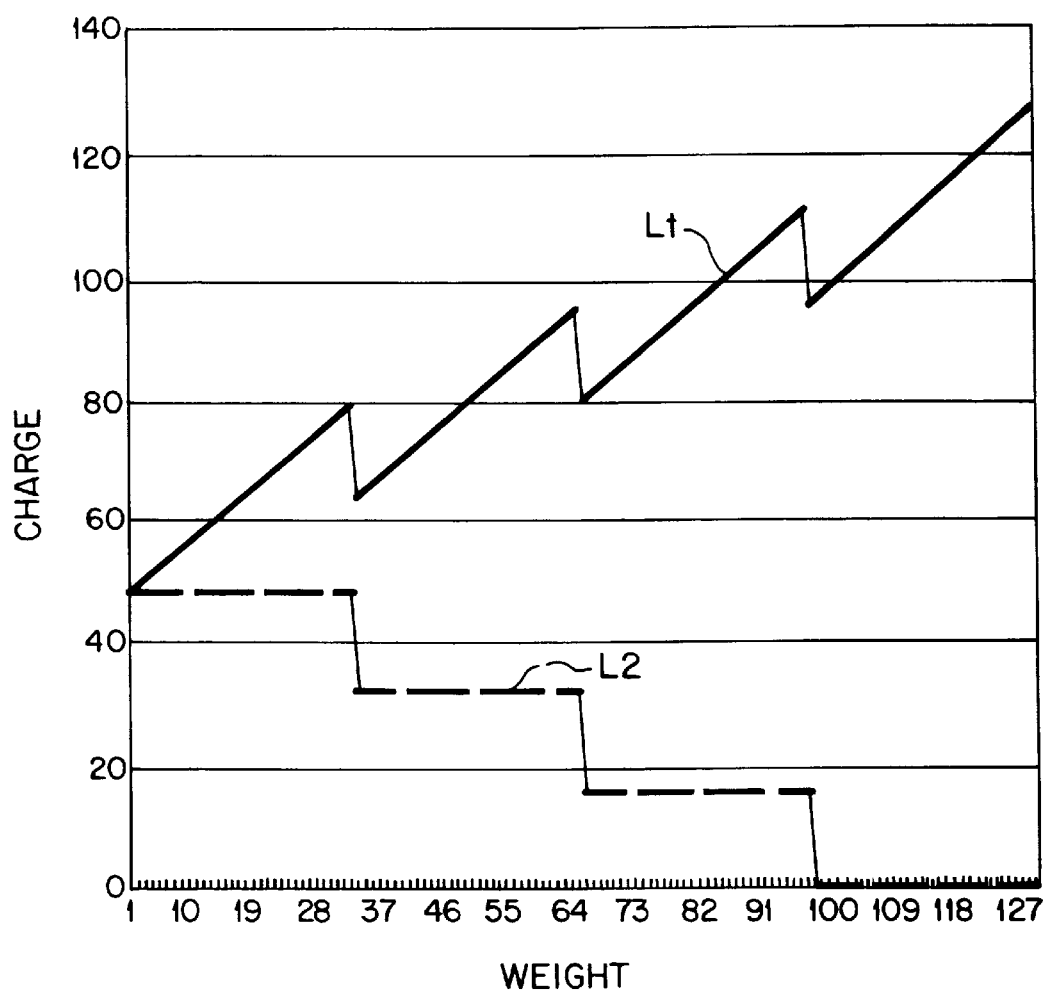
FIG. 20 is a graph of the characteristics of a load in the embodiment.

FIG. 20 is a graph of the characteristics of the load showing that the change of the load is suppressed. The total load can be flatter by providing more capacitances in additional capacity load. The load changes more gently.

When C21 and C22 have the capacity of Cn−1=C6 and Cn=C7, respectively, the signal for connecting MUX21 to N to be $$B6 \cdot \overline{B7}$$

and the signal for connecting MUX22 to N to be $$\overline{B6} \cdot \overline{B7}$$

additional capacity load L2 and the total load Lt are shown in formulas (5) and (6), respectively.

$$L2 = 2^5 \cdot (B6 \cdot \overline{B7}) + 2^6 \cdot (\overline{B6} \cdot \overline{B7}) \qquad (5)$$

$$Lt = \sum_{i=1}^{7} 2^{i-1} \cdot Bi + 2^5 \cdot (B6 \cdot \overline{B7}) + 2^6 \cdot (\overline{B6} \cdot \overline{B7}) \qquad (6)$$

Figure 21:
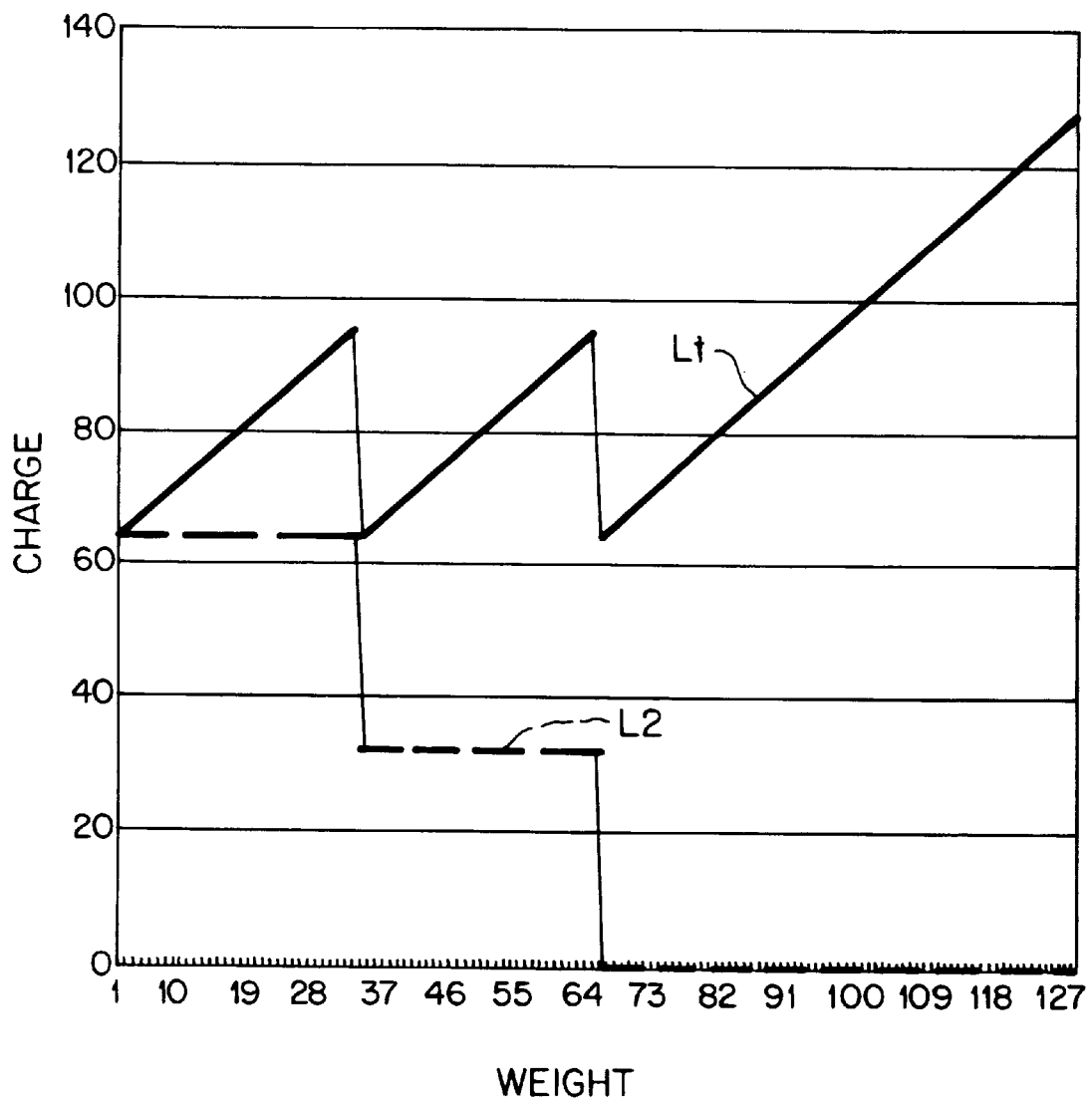
FIG. 21 is a graph of the characteristics of another load.
Figure 22:
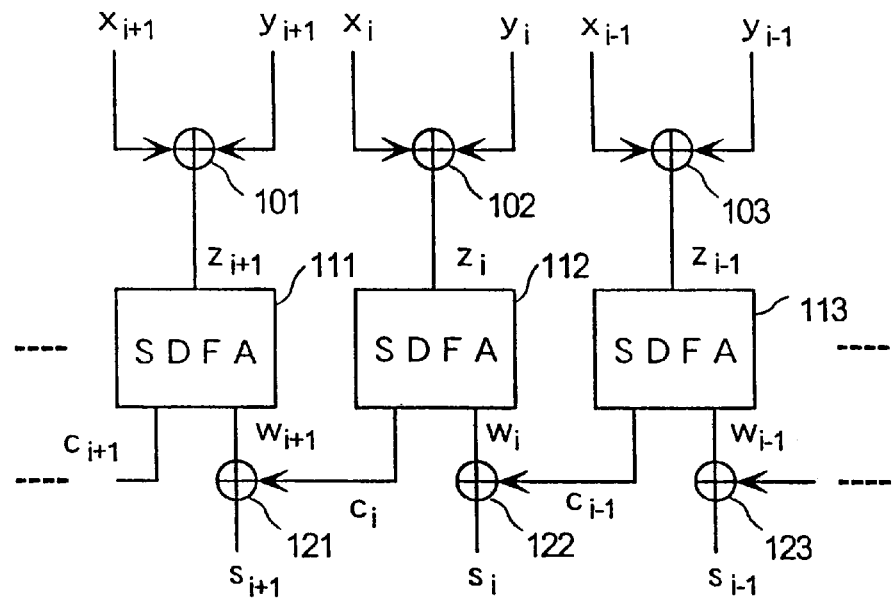
FIG. 22 shows a conventional multi-value adder.
Figure 23:
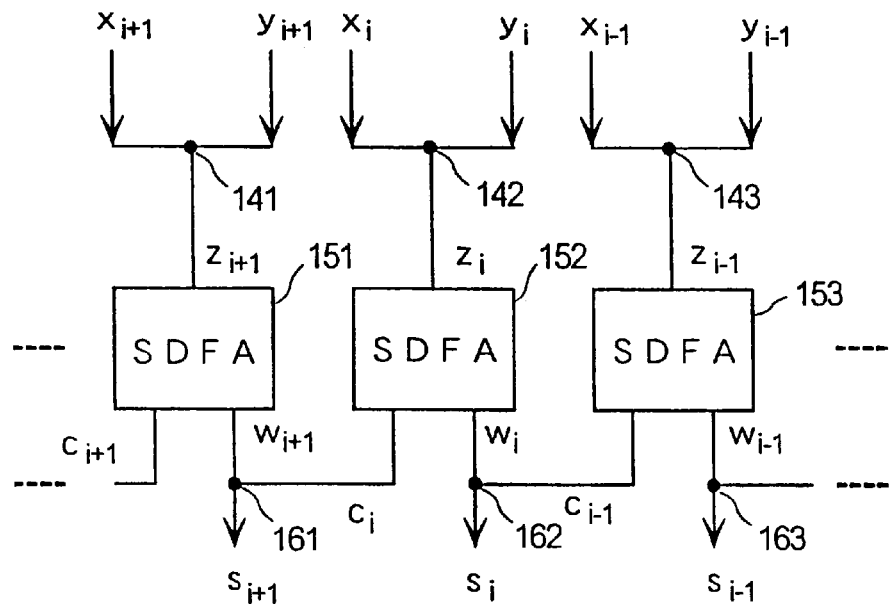
FIG. 23 shows a conventional current-mode multi-value adder.

FIG. 21 shows the characteristics of the capacitive load in this case. The change in the total load is more gentle than that in FIG. 20. However, larger additional capacity charge is necessary, then the circuit size is larger.

The weighted addition circuit can be any other circuits for weighted addition of analog input voltages than the multi-value adder above.

As mentioned above, the computational circuit according to the present invention is low in electrical power consumption because the addition and thresholding are performed by a voltage-driven circuits.

The weighted addition circuit according to the present invention is accurate in computation because an additional capacity load is connected.

What is claimed is:

1. A computational circuit for multi-value addition of two multi-value numbers each having a plurality of digits from a lowest digit to a highest digit comprising:
   i) A plurality of parallel adders corresponding to said digits, each of said parallel adders calculating an intermediate sum of corresponding digit of said two multi-value numbers and a carry, each of said parallel adders comprising a weighted addition circuit which comprises:
      a) a capacitive coupling having a plurality of capacitances output of which are connected to a common output terminal;
      b) an inverting amplifier connected to an output of said capacitive coupling; and
      c) a feedback capacitance connected to said inverting amplifier at its input and output;
   ii) A plurality of output adders corresponding to said parallel adders except for said parallel adder corresponding to said lowest digit, each of said output adders adding said intermediate sum output from said corresponding parallel adder and said carry output from said parallel adder of neighboring lower digit, each of said output adders comprising a weighted addition circuit which comprises:
      a) a capacitive coupling having a plurality of capacitances output of which are connected to a common output terminal;
      b) an inverting amplifier connected to an output of said capacitive coupling; and
      c) a feedback capacitance connected to said inverting amplifier at its input and output;
   iii) A plurality of quantizing circuits corresponding to said output adders and said parallel adder of said lowest digit, each of said quantizing circuits converting an output from said corresponding output adder or said parallel adder into a binary number, each said quantizing circuit comprising a plurality of thresholding circuits corresponding to digits of said binary number, each of said thresholding circuits comprising:
      a) an inverter with a threshold corresponding to a weight of said digit; and
      b) a capacitive coupling for receiving outputs from all of said thresholding circuits of higher digits for weighting said outputs by weights corresponding to weights of said digits; and
   iv) A plurality of logic conversion portions corresponding to said quantizing circuits, each of said logic conversion circuits converting an output of said corresponding quantizing circuit into a second intermediates sum and a second carry data.

2. A computational circuit as claimed in claim 1, wherein said multi-value number is quaternary signed-digit number.

3. A computational circuit as claimed in claim 1, each said quantizing circuit further comprising a plurality of multiplexers corresponding to said outputs from thresholding circuits of higher digits, said multiplexer alternatively outputting a supply voltage or a reference voltage in response to said corresponding outputs from thresholding circuits of higher digits.

4. A computational circuit as claimed in claim 3, wherein said reference voltage is a half of said supply voltage.

5. A computational circuit as claimed in claim 3, wherein said reference voltage is the ground voltage.

6. A computational circuit as claimed in claim 1, said weighted addition circuit of said parallel adder and said output adder further comprising an additional capacitive coupling comprising:
   i) one or more capacitances commonly connected to said inverting amplifier parallelly to said capacitive coupling; and
   ii) one or more switches corresponding to said capacitances for alternatively connecting said supply voltage or said reference voltage to corresponding capacitances.

* * * * *